(12) United States Patent
Benayon et al.

(10) Patent No.: US 8,326,588 B2
(45) Date of Patent: Dec. 4, 2012

(54) FAIR PATH SELECTION DURING SIMULATION OF DECISION NODES

(75) Inventors: Jay William Benayon, Thornhill (CA); Pablo Daniel Irassar, Markham (CA); Vincent Szaloky, Tornoto (CA)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/324,342

(22) Filed: Nov. 26, 2008

(65) Prior Publication Data

US 2010/0131253 A1 May 27, 2010

(51) Int. Cl.
*G06F 17/50* (2006.01)

(52) U.S. Cl. .......................................................... 703/6

(58) Field of Classification Search .................. 703/6, 2; 705/7.25
See application file for complete search history.

(56) References Cited

U.S. PATENT DOCUMENTS

| 7,076,474 | B2 | 7/2006 | Jin et al. | |
|---|---|---|---|---|
| 2007/0179822 | A1 | 8/2007 | Benayon et al. | |
| 2009/0031280 | A1* | 1/2009 | Koehler | 717/104 |
| 2009/0132562 | A1* | 5/2009 | Mehr et al. | 707/100 |

OTHER PUBLICATIONS

Chun Ouyang, Marlon Dumas, Arther H.M. ter Hofstede, Wil M.P. van der Aalst, "From BPMN Process Models to BPEL Web Services " IEEE, 2006, 8 pages.*
Valeria de Castro, Esperanza Marcos, Marcos Lopez Sanz, "Service Composition Modeling: A Case Study", IEEE, 2006, 8 pages.*
M. Bilal, J P Thomas, P Harrington, Ajith Abraham, "BPEL Processes for Non-Repudiation Protocols in Web Services" IEEE, 2005, 6 pages.*
Koide, A; Te-Kai Liu; Bala Ramachandran; M. Kano, Business Process Simulation with IT Depth, IEEE International Conference on E-Commerce Technology for Dynamic E-Business, 2004, vol. 15, Issue 15, Sep. 2004, pp. 333-336.

* cited by examiner

*Primary Examiner* — Dwin M Craig
(74) *Attorney, Agent, or Firm* — Nelson and Nelson; Daniel P. Nelson; Alexis V. Nelson (57) ABSTRACT

An apparatus, method, and computer program product to simulate a business process model wherein a decision node may be modeled using a fair selection process or a random selection process, as selected by an end user. The fair selection process may provide a distribution of invocations among the outgoing paths of a decision node that substantially matches the probabilities assigned to those paths. A fair selection process may do this independent of the number of invocations of the decision node. A random selection process may provide random invocations among the outgoing paths of a decision node according the probabilities assigned to those paths.

22 Claims, 6 Drawing Sheets

FAIR PATH SELECTION DURING SIMULATION OF DECISION NODES

BACKGROUND

1. Field of the Invention

This invention relates to process modeling and simulation and more particularly to simulating decision nodes in a process model.

2. Background of the Invention

Process modeling and simulation relates to the modeling and simulation of dynamic or static systems. Process models generally specify one or more tasks or activities of a process and the relationship between the different tasks or activities. As part of a process model, one or more events or conditions leading to the transition from one task or activity to the next may be specified. Such events or conditions may include sufficient detail to support simulation of the process module. During simulation of a process model, one or more scenarios or inputs may be applied to the process module to determine likely outcomes.

Certain process models may include one or more decision nodes. A decision node typically handles decision branching in a scenario or process model. Decision nodes are typically used when there are multiple possible outcomes. In general, each branch or outgoing path of a decision node may have a condition. The flow through a decision node may be directed to the path whose condition evaluates to true. Current methods for simulating decision nodes do not meet the needs of all end users.

In view of the foregoing, what is needed is an apparatus and method providing an end user greater control and choice when simulating the decision nodes of a process model.

SUMMARY

The invention has been developed in response to the present state of the art and, in particular, in response to the problems and needs in the art that have not yet been fully solved by currently available apparatus and methods. Accordingly, the invention has been developed to provide apparatus and methods for providing a fair selection process during simulation of a decision node.

Consistent with the foregoing, an apparatus and method to provide fair selection during simulation of a decision node is disclosed herein. According to one embodiment of the invention, such a method may include identifying a computer comprising a processor and a memory device operably connected to the processor. The memory device may store a simulation module executable by the processor. The memory device may also store a process model. The process model may include a decision node having two or more outgoing paths and a probability profile specifying a probability for each outgoing path.

The simulation module may receive a command to start a simulation session. During the simulation session, the decision node may be invoked multiple times. Each time the decision node is invoked, it may be simulated using a fair selection process. The fair selection process may provide a distribution of invocations among the outgoing paths of the decision node that substantially matches the probability profile. A fair selection process may do this independent of the number of times the decision node is invoked. Accordingly, even when a decision node is invoked a relatively few number of times, the distribution of invocations may substantially match the probability profile.

In selected embodiments, a fair selection process may comprise a series of steps executed by the simulation module each time the decision node is invoked. This series of steps may include indentifying both the present total number of invocations for each outgoing path and the present total number of invocations for the decision node (including the present invocation) since the start of the simulation session. Using this information, a delta may be calculated for each path of the outgoing paths.

In certain embodiments, a delta may equal the probability of a path (comprising a number between zero and one) times the total number of invocations for the decision node minus the total number of invocations for the path. The series of steps of a fair selection process may further include identifying an outgoing path having a delta that is greater than or equal to the deltas of the other outgoing paths. Once identified, that path may be invoked.

In other embodiments, a delta may indicate how much an actual number of invocations of an outgoing path is less than a probable number of invocations of the path, based on the probability assigned thereto. For example, a delta may equal the probability of an outgoing path (a number between zero and one) times a summation of the invocations of the outgoing paths minus the number of invocations of the outgoing path. In such embodiments, the series of steps of a fair selection process may further include identifying and invoking an outgoing path having a delta that is both greater than or equal to 0.5 and greater than or equal to the deltas of the other outgoing paths.

Alternatively, it may be determined that there are multiple outgoing paths that share the greatest delta or that no outgoing path has a delta that is greater than or equal to 0.5. In such situations, the series of steps may include invoking randomly among the outgoing paths, according to the probability profile. This may be done by invoking randomly among all of the outgoing paths or among only those outgoing paths that share the greatest delta.

In another embodiment of the invention, an alternative method for simulating a business process may include providing, by a simulation module running on a computer, at least two processes for simulating a decision node. The at least two processes may include a random selection process and a fair selection process.

While the simulation module is running on the computer, the simulation module may receive an input specifying that a decision node be simulated using the fair selection process and a command to start a simulation session. During the simulation session, the simulation module may invoke the decision node multiple times. Each time the decision node is invoked, it may be simulated using the fair selection process. The fair selection process may provide a distribution of invocations among the outgoing paths of the decision node that substantially matches the probability profile, independent of the number of times the decision node is invoked.

Alternatively, while the simulation module is running on the computer, the simulation module may receive an input specifying that a decision node be simulated using the random selection process and a command to start a simulation session. During the simulation session, the simulation module may invoke the decision node a number of times. Each time the decision node is invoked, it may be simulated using the random selection process. The random selection process may invoke randomly among the outgoing paths according to the probability profile.

In still another embodiment of the invention, an apparatus for simulating a business process may include a processor, a memory device operably connected to the processor, and a computer program stored on the memory device and executable by the processor. The computer program may provide simulation of a process model comprising a decision node having at least two outgoing paths extending downstream therefrom and a probability profile specifying a probability for each path. The computer program may include a fair selection module, a random selection module, and a user interface.

The fair selection module may be programmed to implement a fair selection process providing a distribution of invocations among the outgoing paths that substantially matches the probability profile, independent of the number of invocations of the decision node. The random selection module may be programmed to implement a random selection process providing random invocations among the at least two paths according to the probability profile. The user interface may be programmed to receive input from an end user indicating whether the fair selection process or the random selection process is to be used in simulating the decision node.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM) device, a read-only memory (ROM) device, an erasable programmable read-only memory (EPROM or Flash memory) device, an optical fiber, a portable compact disc read-only memory (CDROM), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
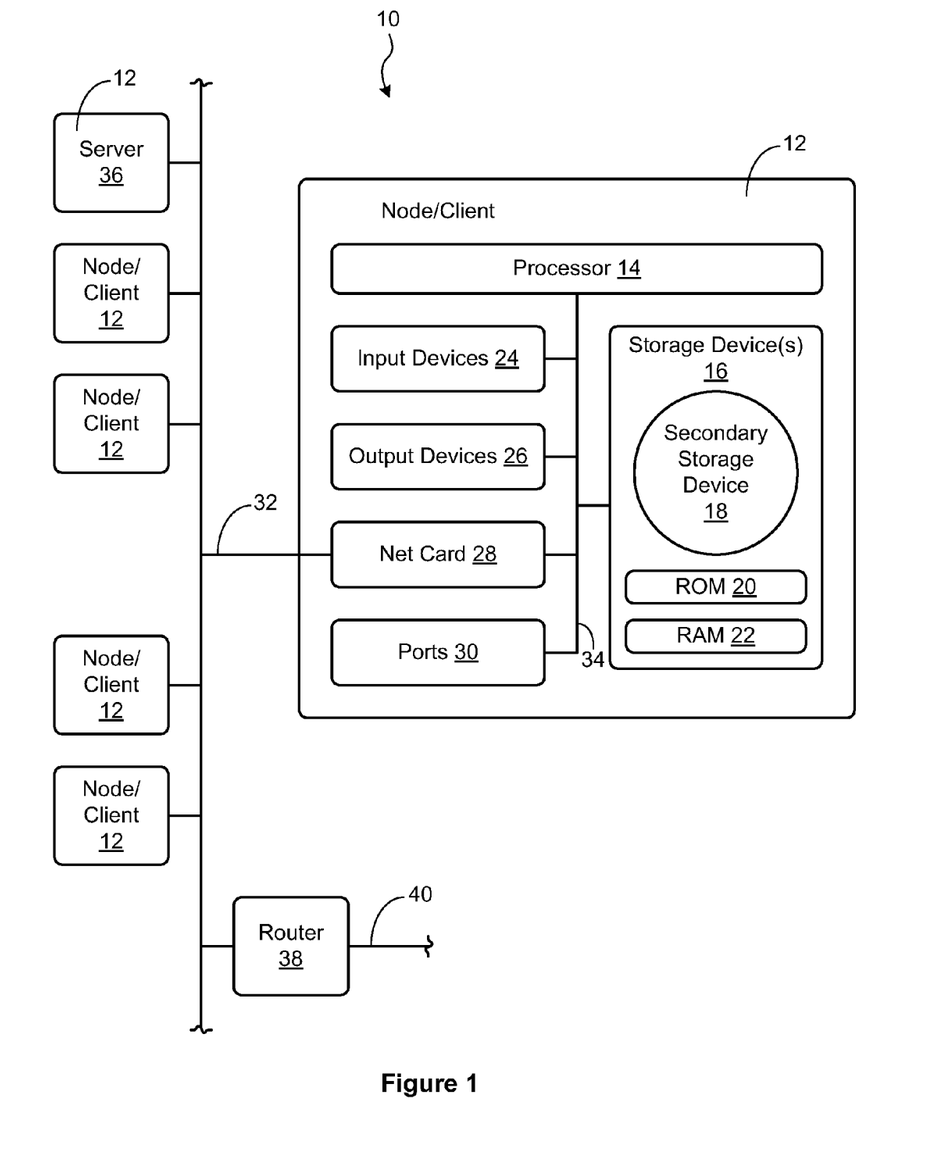
FIG. 1 is a high-level block diagram of one embodiment of a computer system configured to provide fair path selection in simulated decision nodes.

Referring to FIG. 1, in selected embodiments, an apparatus 10 may include one or more nodes 12, computers 12, clients 12, or the like. A node 12 may include a processor 14 or central processing unit (CPU) 14. A node 12 may also include a storage device 16. One or more storage devices 16 may be operably connected to a processor 14 and may include a secondary storage device 18 (e.g., a hard drive) or other non-volatile storage device 18, read-only memory (ROM) 20, random access memory (RAM) 22, or the like. These components 14, 16, 18, 20, 22 may exist in a single node 12 or may be distributed across multiple nodes 12.

In selected embodiments, a node 12 may include one or more input devices 24 such as a keyboard, mouse, touch screen, scanner, memory device, communication line, and the like. A node 12 may also include one or more output devices 26 such as a monitor, printer, data storage device, and the like. A node 12 may further include a network card 28, port 30, or the like to facilitate communication through a network 32. Internally, one or more busses 34 may operably interconnect the various components 14, 16, 24, 26, 28, 30 of a node 12 to provide communication therebetween. Each node 12 of an apparatus 10 may contain more or less of the components described hereinabove.

An apparatus 10 may further include one or more servers 36 and the like to serve files, data, applications, etc. to nodes 12 connected thereto. An apparatus 10 may also include one or more routers 38 and the like. Accordingly, one network 32 may be connected to other networks 40 via one or more routers 38.

Figure 2:
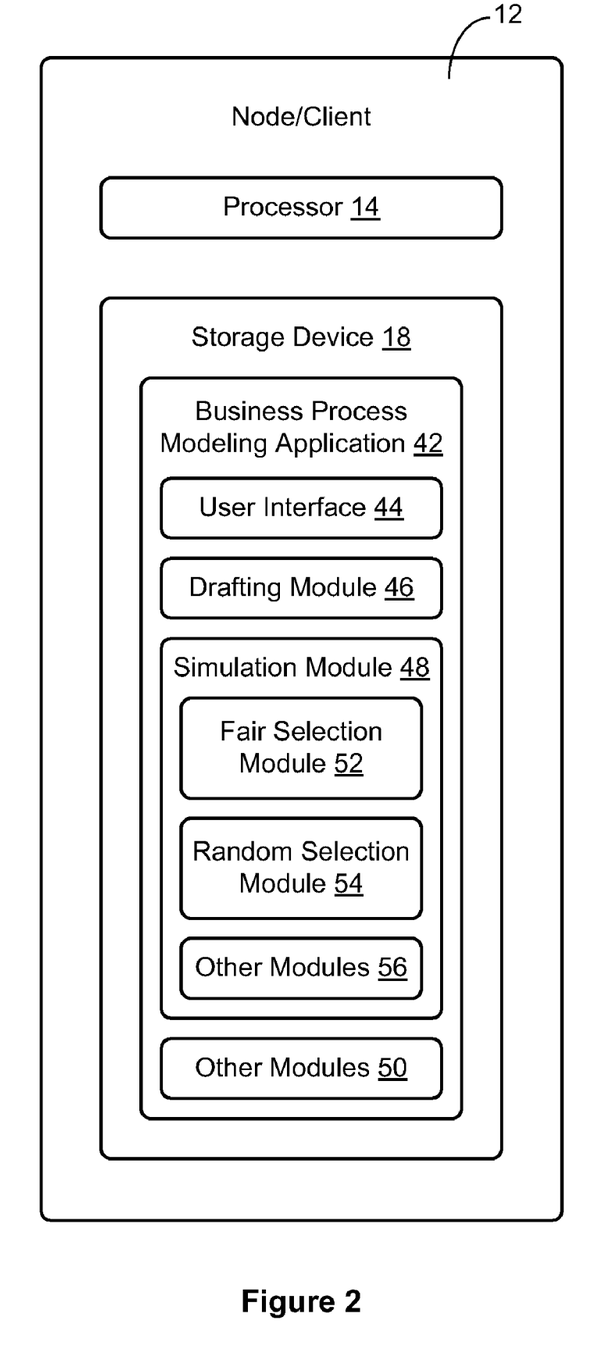
FIG. 2 is a schematic block diagram of one embodiment of a computer programmed with a business process modeling application in accordance with the invention.

Referring to FIG. 2, a process model may be an abstract description of a process (e.g., a business process). Process models generally specify one or more tasks or activities of a process and the relationship between the different tasks or activities. Models may be expressed according to a specific format. Exemplary formats include Activity Decision Flow (ADF), Unified Modeling Language (UML) activity diagrams, Business Process Execution Language (BPEL), and the like.

As part of a process model, one or more events or conditions leading to the transition from one task or activity to the next may be specified. Such detail may support simulation of the process model. During simulation, a process model may be analyzed to determine likely outcomes, bottlenecks, efficiencies, problems, and the like for the process being modeled.

Process modeling and simulation may be applied to dynamic or static systems, which can include, but are not limited to, enterprise management systems, engineering systems, networked information technology systems, utility systems, utility computing systems, autonomic computing systems, on-demand systems, electric power grids, biological systems, medical systems, weather systems, financial market systems, and business process systems. Such systems can be modeled and simulated for a variety of purposes including monitoring, analysis, control, design, simulation, and management.

In selected embodiments, a node 12 may be configured to store and run an application 42 providing modeling, simulation, or a combination thereof for processes such as business processes. In certain embodiments, an application 42 providing such functionality may include a user interface 44, drafting module 46, simulation module 48, and other modules 50 as desired or necessary. A user interface 44 may support communication between an end user and an application 42. A drafting module 46 may support importing, creating, editing, and the like of one or more process models. A simulation module 48 may support simulation of a process model.

In selected embodiments, a simulation module 48 may include a fair selection module 52, random selection module 54, and other modules 56 as desired or necessary. A fair selection module 52 may support simulation using a fair selection process. In contrast, a random selection module 54 may support simulation using a random selection process.

Figure 3:
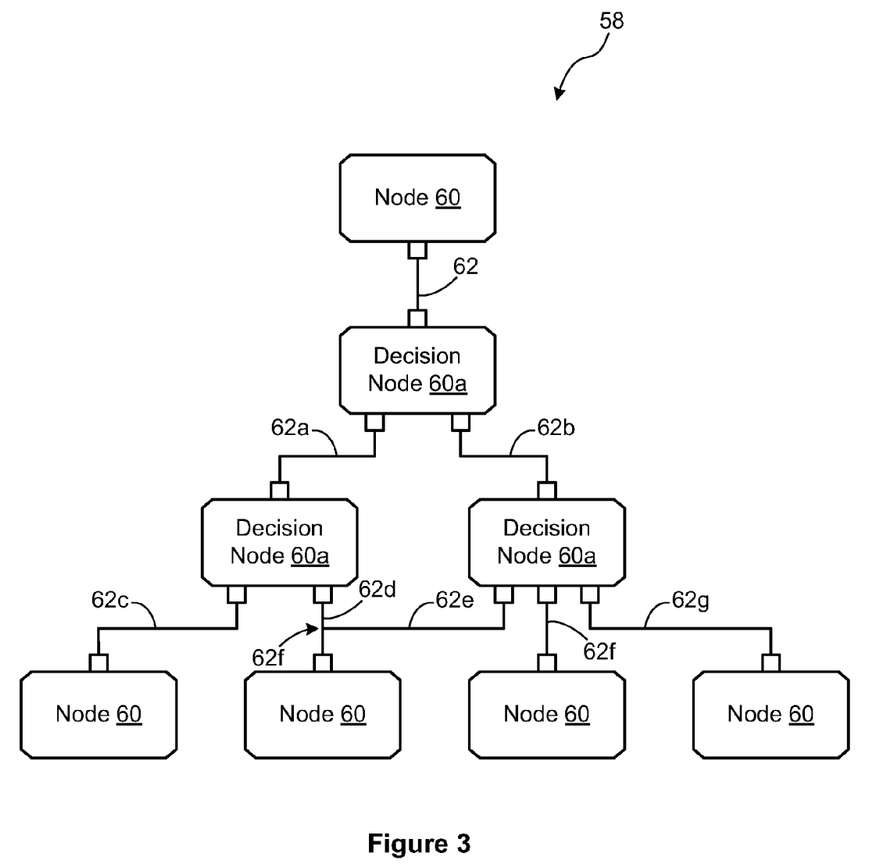
FIG. 3 is a schematic block diagram of one embodiment of a generic process model in accordance with the invention.

Referring to FIG. 3, a process model 58 may provide a set of nodes 60 connected by flow of control, data, product, people, or the like. A core set of nodes 60 may include task, decision, merge, fork, and join nodes. Task nodes may be nodes 60 where actions are performed. Decision nodes 60a may be nodes 60 where decisions are made and the flow of the process branches into distinct paths 62. Merge nodes may be nodes 60 where branches 62 or paths 62 are brought together. Fork nodes may be nodes 60 where the flow of a process forks into multiple, parallel, paths 62. Join nodes may be nodes 60 where the parallel flows of control from a previous fork node are brought together.

A decision node 60a may have two or more outgoing paths 62. In the illustrated embodiment, two decision nodes 60a have two outgoing paths 62a, 62b, 62c, 62d, while a third decision node 60a has three outgoing paths 62e, 62f, 62g. Other arrangements of decision nodes 60a and numbers of outgoing paths 62 are possible and within the scope of the present invention.

In selected embodiments, a process model 58 may include a probability profile. A probability profile may include individual probabilities assigned to each of the outgoing paths 62 of the decision nodes 60a within a process model 58. The probabilities assigned may vary as desired or necessary to provide the simulation desired. In general, the sum of the probabilities for the outgoing paths 62 of a particular decision node 60a may equal 100 percent. However, the probabilities for the individual outgoing paths need not follow any particular pattern. For example, for one decision node 60a, the outgoing paths 62a, 62b may have equal probabilities (50 percent each) assigned thereto. For other decision nodes 60a, the outgoing paths 62c, 62d may have unequal probabilities (e.g., 59 percent and 41 percent) assigned thereto. For still other decision nodes 60a, the outgoing paths 62e, 62f, 62g may have still other probability arrangements (e.g., 49 percent, 49 percent, and 2 percent).

Figure 4:
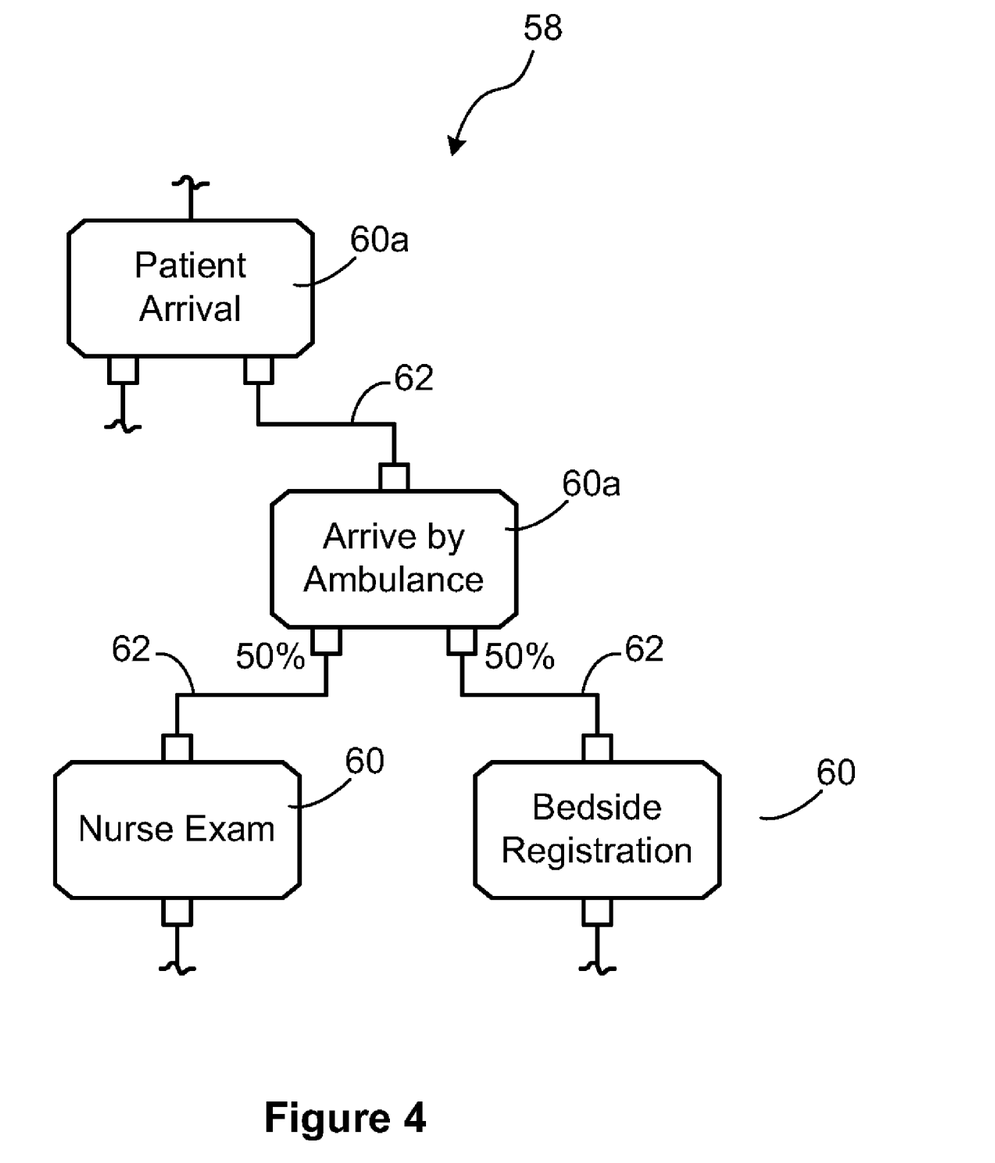
FIG. 4 is a schematic block diagram of one embodiment of a more specific process model in accordance with the invention.

Referring to FIG. 4, during simulation, an application 42 may invoke various nodes 60, paths 62, or the like. An invocation may include an indication stored by a computer 12 that a particular node 60 has been reached or that a particular path 62 has been followed. Accordingly, a series of invocations may define the flow of data, control, product, people, or the like through a process model 58.

For example, in one embodiment, a process model 58 (or a subset thereof) may model the flow of patients within a hospital. In the illustrated embodiment, a process model 58 includes a node 60*a* representing patient arrival. Of the patients arriving, a portion may arrive by ambulance. Accordingly, the process model 58 may include a node 60*a* representing arrival by ambulance. After arrival by ambulance, patients may move on to a nurse exam or beside registration. Thus, the process model may include nodes 60 for nurse exam and bedside registration. In the illustrated embodiment, the probabilities for the two outgoing paths 62 of the arrive by ambulance node 60*a* are set to 50 percent. However, as set forth above, other probabilities and probability profiles are also possible.

During simulation of the illustrated process model 58, only a portion of the invocations of the patient arrival node 60*a* will result in invocations of the arrive by ambulance node 60*a*. Similarly, only a portion of the invocations of the arrive by ambulance node 60*a* will result in invocations of the nurse exam node 60, etc. Thus, by recording invocations of the various nodes 60, paths 62, or both, an application 42 may collect data on how a process being modeled would perform in the real world.

Figure 5:
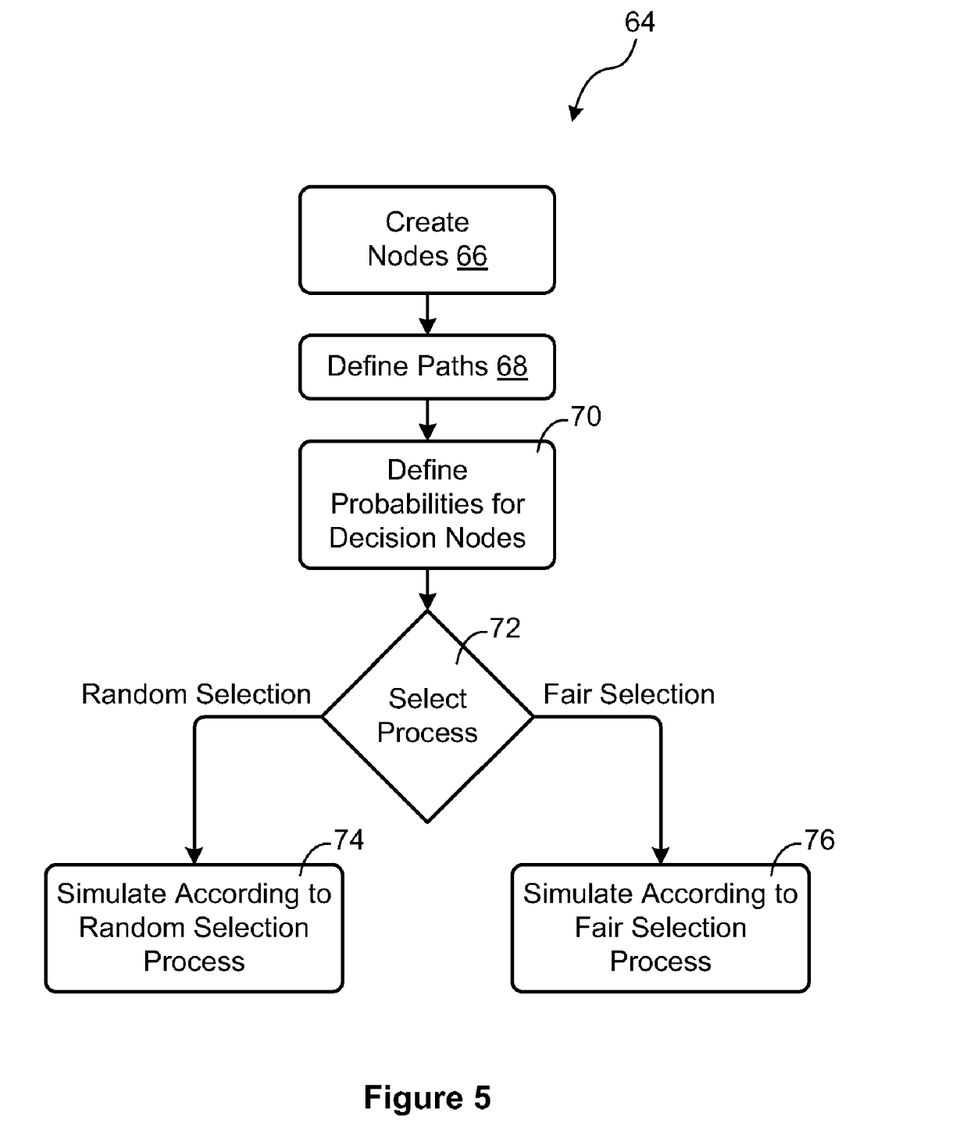
FIG. 5 is a block diagram of one embodiment of a method for generating a process model in accordance with the invention.

Referring to FIG. 5, while continuing to refer generally to FIG. 4, in selected embodiments, an application 42 may support a method 64 for generating a process model 58. The method 64 may include the steps of creating 66 nodes 60 and defining 68 the paths 62 connecting the nodes 60. The method 64 may also include defining 70 the probabilities for the outgoing paths 62 of the decision nodes 60*a*. Additionally, in selected embodiments, the method 64 may include a choice 72 of whether to simulate a decision node 60*a* using a random selection process or a fair selection process. This choice 72 may be presented on a node-by-node basis, globally across a process model 58, for a subset of a process model 58, or some combination thereof. Once the selection process is chosen 72, the method 64 may then simulate the decision node 60*a* in accordance therewith (i.e., using 74 the random selection process or using 76 the fair selection process, as specified).

A random selection process may provide random invocations among the outgoing paths 62 of a decision node 60*a* according to the probability profile assigned thereto. Accordingly, should a user choose 72 to simulate the illustrated arrive by ambulance node 60*a* using 74 a random selection process, the end result of whether a patient flows to a nurse exam node 60 or a bedside registration node 60 may be determined like the flip of a coin. Thus, with five invocations of the arrive by ambulance node 60*a*, there are six possible ratios for invocations of the nurse exam node 60 versus invocations of the bedside registration node 60 (i.e., 0:5, 1:4, 2:3, 3:2, 4:1, and 5:0). Using a random selection process, a high number of invocations of the arrive by ambulance node 60*a* are required to "guarantee" that the distribution of invocations among the outgoing paths 62 will more or less reflect the assigned probabilities.

In contrast, by using 76 a fair selection process, an end user may be sure to receive a distribution of invocations among the outgoing paths 62 of a decision node 60*a* that substantially matches the probabilities assigned to those outgoing paths 62. Using 76 a fair selection process, an end user may receive such a "fair" distribution without regard to (independent of) the number of times a decision node 60*a* is invoked.

In process model simulation, invocations are not typically split. For example, it may not be logical to split an invocation at the arrive by ambulance node 60, sending some portion of a patient to a nurse exam 60 and the remaining portion of the patient to a bedside registration 60. Thus, invocations may be counted in whole numbers.

Counting in whole numbers may influence what may be considered a substantial match to the probabilities assigned to the outgoing paths 62 of a decision node 60*a*. For example, an end user may choose 72 to simulate the illustrated arrive by ambulance node 60*a* using 76 the fair simulation process. However, during a simulation session, the arrive by ambulance node 60*a* may only be invoked three times. In such a situation, there is no way to use whole numbers and reflect the 50 percent probability assigned to each outgoing path 62. Accordingly, the best a fair simulation process may do is distribute invocations amount the paths 62 such that two invocations are directed to one path 62 and one invocation is directed to the other path 62. Under such circumstances, a two-to-one distribution may be considered a substantial match to the 50 percent probabilities assigned.

Figure 6:
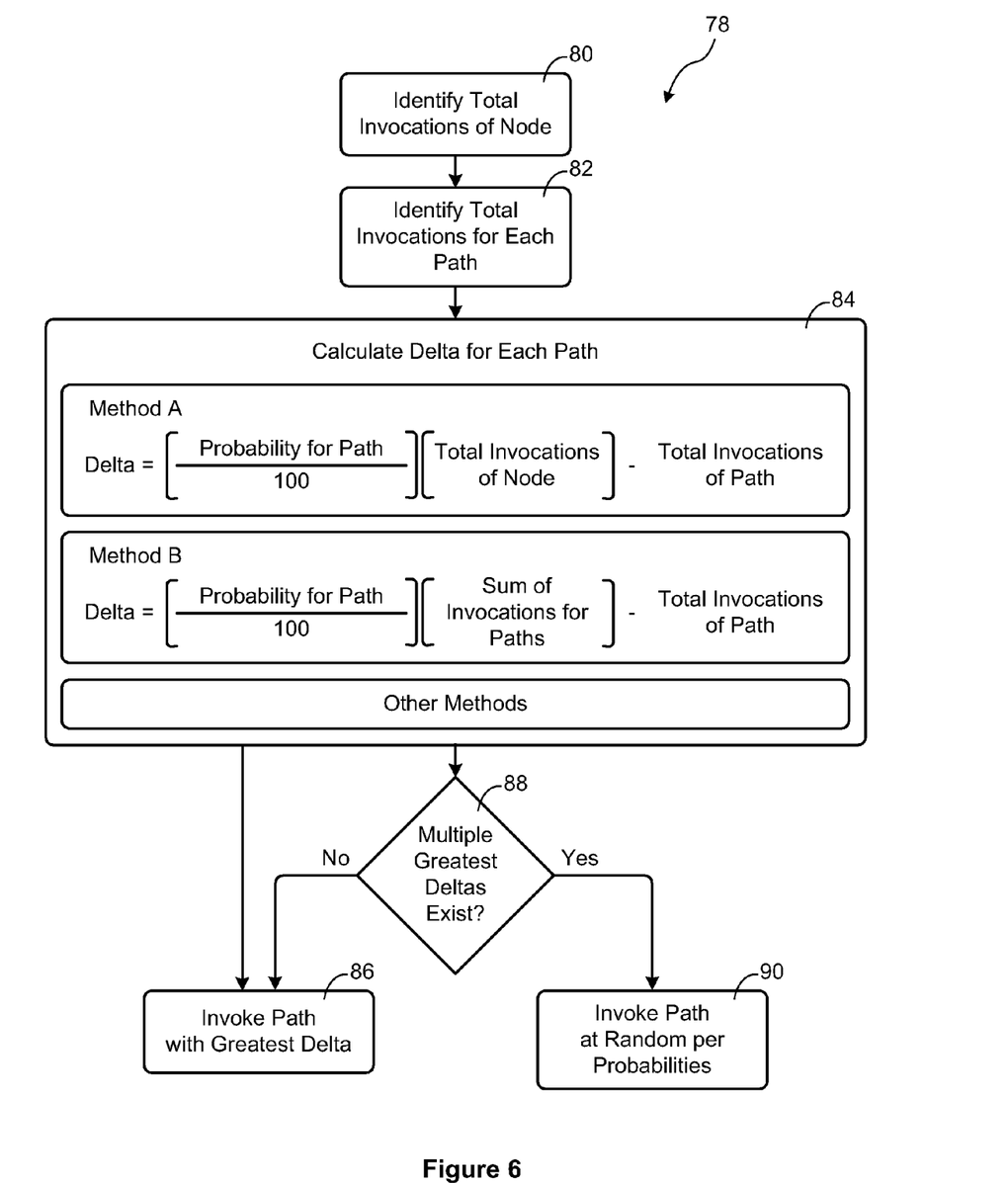
FIG. 6 is a block diagram of one embodiment of a method for providing fair path selection in accordance with the invention.

Referring to FIG. 6, a fair selection process 78 may use any of a number of mathematical methodologies to distribute invocations among the outgoing paths 62 of a decision node 60*a*. Some mathematical methodologies may be more complex than others. Moreover, different mathematical methodologies may produce different levels of adherence to the assigned probabilities.

In selected embodiments, a fair selection process 78 may include the steps of identifying 80 the total number of invocations of a decision node 60*a* and identifying 82 the total number of invocations of each outgoing path 62 of the decision node 60*a*. With this information, the process 78 may include calculating 84 a delta for each outgoing path 62 of the decision node 60*a*.

A delta may be a number characterizing the distance between the number of invocations a path 62 has actually received and an expected (or most probable) number of invocations for the path 62. For example, if a decision node 60*a* with two outgoing paths 62 having respective probabilities of 30 percent and 70 percent were invoked ten times, then the expected or probable number of invocations would be 3 and 7, respectively.

A delta may be calculated in any suitable manner. In one embodiment, a delta may be equal to the probability of a path 62 times the number of invocations of the node 60*a* minus the number of invocations of the path 62. In such an embodiment, the probability of the path 62 may include a number between zero and one (i.e., be equal to the probability in percent format divided by 100). Additionally, the number of invocations of the node 60*a* may include the present invocation. Accordingly, the number of invocations of the node 60*a* may be equal to one more than a summation of the invocations of the outgoing paths 62.

In an alternative embodiment, a delta may indicate how much an actual number of invocations of an outgoing path 62 is less than a probable number of invocations of the outgoing path 62. That is, a delta may be equal to the probability of a path 62 times a summation of the invocations of the outgoing paths 62 minus the number of invocations of the path 62. In such an embodiment, the probability of the path 62 may again include a number between zero and one (i.e., be equal to the probability in percent format divided by 100).

The manner in which a delta is calculated 84 may affect how it is used in the subsequent steps of a fair selection process 78. For example, after calculating 84 a delta for each outgoing path 62 using the first method illustrated (Method A), a fair selection process 78 may directly invoke 86 an outgoing path 62 having a delta that is greater than or equal to the deltas of the other outgoing paths 62. Alternatively, after calculating 84 a delta for each outgoing path 62 using the second method illustrated (Method B), a fair selection process 78 may directly invoke 86 an outgoing path 62 having a delta that is both greater than 0.5 and greater than or equal to the deltas of the other outgoing paths 62.

In selected embodiments, rather than directly invoking a particular path 62 after calculating 84 a delta for each outgoing path, a fair selection process 78 may determine 88 whether multiple outgoing paths 62 share the greatest delta. If there is not a shared greatest delta, the outgoing path 62 with the greatest delta (or greatest delta over 0.5) may be invoked 86. However, if multiple paths 62 share the greatest delta, a path 62 may be invoked 90 at random according to the assigned probabilities. In selected embodiments, any outgoing path 62 corresponding to the node 60*a* may be randomly invoked 90. In other embodiments, only those outgoing paths 62 sharing the greatest delta may be randomly invoked 90.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for simulating a process, the method comprising:
   identifying a computer comprising a processor and a memory device operably connected to the processor, the memory device storing a simulation module executable by the processor;
   loading, onto the memory device, a process model comprising a decision node having at least two paths extending downstream therefrom and a probability profile specifying a probability for each path of the at least two paths;
   running the simulation module on the computer;
   receiving, by the simulation module, a command to start a simulation session;
   invoking, by the simulation module, the decision node a number of times; and
   simulating, by the simulation module, the decision node using a fair selection process to provide a distribution of invocations among the at least two paths that substantially matches the probability profile, independent of the number of times.

2. The method of claim 1, wherein the fair selection process comprises a series of steps executed by the simulation module each time the decision node is invoked.

3. The method of claim 2, wherein the series of steps comprises identifying a plurality of path totals consisting of a path total for each path of the at least two paths, each path total thereof equaling the present total number of invocations for a corresponding path since the start of the simulation session.

4. The method of claim 3, wherein the series of steps further comprises identifying an invocation total corresponding to the present total number of invocations for the decision node, the invocation total equaling one more than a summation of the plurality of path totals.

5. The method of claim 4, wherein the series of steps further comprises calculating a delta for each path of the at least two paths, the delta being equal to the probability of a corresponding path times the invocation total minus the path total of the corresponding path, the probability of the corresponding path comprising a number between zero and one.

6. The method of claim 5, wherein the series of steps further comprises identifying a path of the at least two paths having a corresponding delta that is greater than or equal to each delta of the other paths of the at least two paths.

7. The method of claim 6, wherein the series of steps further comprises invoking the path.

8. The method of claim 2, wherein the series of steps comprises calculating a delta for each path of the at least two paths, the delta indicating how much less an actual number of invocations of a corresponding path of the at least two paths is than a probable number of invocations of the corresponding path, based on the probability assigned thereto.

9. The method of claim 8, wherein the series of steps further comprises identifying a path of the at least two paths having a corresponding delta that is both greater than or equal to 0.5 and greater than or equal to each delta of the other paths of the at least two paths.

10. The method of claim 9, wherein the series of steps further comprises invoking the path.

11. The method of claim 8, wherein the series of steps further comprises determining that no path of the at least two paths has a corresponding delta that is greater than or equal to 0.5.

12. The method of claim 11, wherein the series of steps further comprises invoking randomly among the at least two paths according to the probability profile.

13. The method of claim 11, wherein the series of steps further comprises determining that multiple paths of the at least two paths share a greatest delta.

14. The method of claim 13, wherein the series of steps further comprises invoking randomly among the multiple paths of the at least two paths that share the greatest delta according to the probability profile.

15. A method for simulating a business process, the method comprising:
    identifying a computer comprising a processor and a memory device operably connected to the processor, the memory device storing a simulation module executable by the processor;
    loading, onto the memory device, a business process model comprising a decision node having at least two paths extending downstream therefrom and a probability profile specifying a probability for each path of the at least two paths;
    running the simulation module on the computer;
    providing, by the simulation module, at least two processes for simulating the decision node, the at least two processes comprising a random selection process and a fair selection process;
    receiving, by the simulation module, an input specifying that the decision node be simulated using the fair selection process;

receiving, by the simulation module, a command to start a simulation session;

invoking, by the simulation module, the decision node a number of times; and simulating, by the simulation module, the decision node using the fair selection process to provide a distribution of invocations among the at least two paths that substantially matches the probability profile, independent of the number of times.

16. The method of claim 15, wherein the fair selection process comprises a series of steps executed by the simulation module each time the decision node is invoked.

17. The method of claim 16, wherein the series of steps comprises:

identifying a plurality of path totals consisting of a path total for each path of the at least two paths, each path total thereof equaling the present total number of invocations for a corresponding path since the start of the simulation session;

identifying an invocation total corresponding to the present total number of invocations for the decision node, the invocation total equaling one more than a summation of the plurality of path totals;

calculating a delta for each path of the at least two paths, the delta being equal to the probability of a corresponding path times the invocation total minus the path total of the corresponding path, the probability of the corresponding path comprising a number between zero and one;

identifying a path of the at least two paths having a corresponding delta that is greater than or equal to each delta of the other paths of the at least two paths; and invoking the path.

18. The method of claim 15, wherein the random selection process comprises invoking randomly among the at least two paths according to the probability profile.

19. An apparatus for simulating a business process, the apparatus comprising:

a processor;

a memory device operably connected to the processor;

a computer program stored on the memory device and executable by the processor, the computer program providing simulation of a business process model comprising a decision node having at least two paths extending downstream therefrom and a probability profile specifying a probability for each path of the at least two paths, the computer program comprising:

a user interface, a fair selection module programmed to implement a fair selection process providing a distribution of invocations among the at least two paths that substantially matches the probability profile, independent of the number of invocations of the decision node, and a random selection module programmed to implement a random selection process providing random invocations among the at least two paths according to the probability profile.

20. The apparatus of claim 19, wherein the user interface is programmed to receive input from an end user indicating whether the fair selection process or the random selection process is to be used in simulating the decision node.

21. A computer program product to simulate a business process, the computer program product comprising a non-transitory computer-readable storage medium having computer-usable program code embodied therein, the computer-usable program code comprising:

computer-usable program code to simulate a business process model comprising a decision node having at least two paths extending downstream therefrom, and a probability profile specifying a probability for each path of the at least two paths;

computer-usable program code to provide a user interface;

computer-usable program code to implement a fair selection process providing a distribution of invocations among the at least two paths that substantially matches the probability profile, independent of the number of invocations of the decision node; and computer-usable program code to implement a random selection process providing random invocations among the at least two paths according to the probability profile.

22. The computer program product of claim 21, further comprising computer-usable program code to receive, through the user interface, input from an end user indicating whether the fair selection process or the random selection process is to be used in simulating the decision node.

* * * * *